United States Patent [19]

Palmer et al.

[11] Patent Number: 5,362,770
[45] Date of Patent: Nov. 8, 1994

[54] HYDROPHOBICITY THROUGH METAL ION ACTIVATION

[75] Inventors: Bruce R. Palmer; Rodney D. Stramel, both of Edmond, Okla.

[73] Assignee: Kerr-McGee Chemical Corporation, Oklahoma City, Okla.

[21] Appl. No.: 63,269

[22] Filed: May 14, 1993

Related U.S. Application Data

[62] Division of Ser. No. 962,343, Oct. 16, 1992, Pat. No. 5,260,353.

[51] Int. Cl.$^5$ .......................... C08K 9/10; C08K 9/12; C08K 9/02; C08K 9/09
[52] U.S. Cl. .................................... 523/200; 523/210; 523/211; 523/212; 523/213; 523/216
[58] Field of Search ............... 523/200, 210, 211, 212, 523/213, 216

[56] References Cited

U.S. PATENT DOCUMENTS

| | | | |
|---|---|---|---|
| 3,556,828 | 1/1971 | Durrant et al. | 523/200 |
| 4,322,457 | 3/1982 | Baron et al. | 427/98 |
| 4,375,989 | 3/1983 | Makinen | 106/300 |
| 4,460,655 | 7/1984 | Jacobson | 428/530 |
| 4,490,179 | 12/1984 | Bernhard | 106/308 |
| 4,505,755 | 3/1985 | Shinozuka et al. | 106/308 |
| 4,539,048 | 9/1985 | Cohen et al. | 106/287.17 |
| 4,539,049 | 9/1985 | Cohen et al. | 106/287.17 |
| 4,551,497 | 11/1985 | Shinozuka et al. | 524/423 |
| 4,792,539 | 12/1988 | Yamanaka et al. | 501/144 |

*Primary Examiner*—Peter Szekely
*Attorney, Agent, or Firm*—Herbert M. Hanegan

[57] ABSTRACT

A method of increasing the hydrophobicity of solid materials. The inventive method comprises the steps of: (a) metal ion activating the surface of a solid substrate material to provide reactive metal sites on the surface and (b) chemically bonding a surfactant to the surface at the reactive metal sites. Titanium dioxide pigments and other particulate property modifiers treated in accordance with the inventive method are more readily dispersed in polymer compositions.

20 Claims, 1 Drawing Sheet

HYDROPHOBICITY THROUGH METAL ION ACTIVATION

This application is a division of application Ser. No. 07/962,343, filed on Oct. 16, 1992, now U.S. Pat. No. 5,260,353.

FIELD OF THE INVENTION

The present invention relates to methods of improving the hydrophobicity of substrates and to substrates treated by such methods. In one aspect, the present invention relates to methods of bonding surfactants to the surfaces of substrates and to substrates having surfactants bonded thereto. In another aspect, the present invention relates to methods of forming polymeric compositions having surface treated particulate property modifiers dispersed therein and to polymeric compositions formed by such methods. In yet another aspect, the present invention relates to surface treated pigment materials and to methods of surface treating pigment materials. In yet another aspect, the present invention relates to methods of removing particulate materials from aqueous media. In yet another aspect, the present invention relates to methods of altering the porosity of porous materials. In yet another aspect, the present invention relates to methods of dispersing particulate reinforcements in polymeric compositions. In still another aspect, the present invention relates to methods of dispersing aggregate in asphalt.

BACKGROUND OF THE INVENTION

Particulate property modifiers (e.g., fillers, opacifiers, pigments, reinforcements, fire retardants, etc.) are commonly used in polymer compositions. Prior to incorporating a particulate property modifier in a polymer composition, the particulate property modifier can be surface treated in order to increase the hydrophobicity of the property modifier. Increasing the hydrophobicity of the property modifier generally improves the dispersibility of the material in the polymer composition and increases the strength of the bond formed between the property modifier and the polymer matrix. As a result, (a) the particulate property modifier is more easily incorporated in the polymer composition, (b) a greater amount of the particulate property modifier can be incorporated in the polymer composition, and/or (c) the overall strength of the resulting polymer product is increased.

In one method commonly used for increasing the hydrophobicity of particulate property modifiers, the surface of a material is reacted with a silicon or titanium alkoxide coupling agent. Silicon and titanium alkoxides have been used successfully to treat numerous types of particulate materials. However, silicon and titanium alkoxides are relatively expensive and, therefore, are typically used only in special applications.

In another method commonly used for increasing the hydrophobicity of particulate pigmentary materials, a hydrous metal oxide (e.g., a hydrous oxide of aluminum, zinc, titanium, zirconium, or magnesium) is first precipitated on the surface of a particulate pigmentary material. Next, a surfactant (e.g., a saturated or unsaturated long-chained fatty acid or acid salt, a long-chained alcohol, a polyalcohol, dimethylpolysiloxane, or polyethylhydrosiloxane) is adsorbed on the hydrous metal oxide whereby the hydrophobicity of the particulate material is substantially improved. Unfortunately, however, the hydrous metal oxide precipitation step of this treatment method is typically a very lengthy process.

In their book entitled "Flotation," American Institute of Mining, Metallurgical and Petroleum Engineers, Inc., N.Y. 1976, pp. 148–196, M. C. Fuerstenau and B. R. Palmer discuss the anionic flotation of mineral oxides and silicates. Anionic collectors disclosed as useful for the flotation of mineral oxides and silicates include carboxylates (fatty acids), sulfonates, alkyl sulfates, and certain chelating agents. Collector adsorption may occur by electrostatic attraction to the mineral surface, by association of the collector, or by the chemical interaction of the collector with metal ions comprising the mineral surface. Metal ions comprising the mineral surface can include specifically adsorbed ions. Examples of specifically adsorbed ions include polyvalent metal ions in a pH region in which the metal ions hydrolyze to form hydroxy complexes. Fuerstenau and Palmer also suggest, based on experimental evidence, that collector adsorption in chemisorption systems can involve: (1) slight dissolution of the mineral followed by hydrolysis of metal ions contained in the dissolved mineral material, (2) adsorption of the resulting metal ion hydroxy complexes on the mineral surface by either hydrogen bonding or water formation, and (3) collector adsorption on the resulting metal ion sites. Fuerstenau and Palmer further suggest that, in the case of quartz, flotation is obtained only after metal ions are added to the system in a pH range within which the hydrolysis of the metal ions to their first hydroxy complex occurs.

Japanese Patent 2-279791 discloses a lubricant composite having a surface treated sericite material dispersed therein. The lubricant composite is formed by a method comprising the steps of: (a) suspending ultrafine particles of sericite in water and then adjusting the pH of the suspension to a value in the range of from 7 to 12; (b) adding an alkaline earth metal salt to the suspension so that alkaline earth metal ions are adsorbed on the surface of the sericite; (c) treating the resulting suspension with an anionic surfactant so that an adsorption film composed of the anionic surfactant is formed on the surface of the sericite; (d) drying the sericite; and (e) blending the dried sericite product with a nonionic surfactant and a carrier oil.

SUMMARY OF THE INVENTION

The present invention provides an inexpensive, quick, and effective method for increasing the hydrophobicity of various substrate materials. In the inventive method, a surfactant is strongly bonded to the surface of a substrate material through the use of a metal ion activation process.

The inventive method can generally be used in any situation where the production of a hydrophobic substrate is desirable. In one embodiment of the inventive method, surface-treated particulate property modifiers are provided which (a) are highly dispersible in polymer compositions and (b) yield polymer compositions of greater overall strength. In another embodiment, the inventive method is used to pretreat the surfaces of nonparticulate substrates so that paints, inhibitors, and other polymer coatings can be more strongly bonded to these substrates. In yet another embodiment, the inventive method is used to facilitate the removal of particulate materials from aqueous media by increasing the hydrophobicity of these materials. In yet another embodiment, the inventive method is used to alter the porosity of porous solid materials and to increase the hydrophobicity of the external surfaces and pore surfaces of these materials. In still another embodiment, the inventive method is used to surface treat an aggregate material so that the aggregate material is more readily dispersible in asphalt.

In one aspect, the present invention provides a method of forming a polymeric composition. The method comprises the step of dispersing a treated particulate property modifier in a polymeric material. The treated particulate property modifier is a material which has been produced by a process comprising the steps of: (a) metal ion activating the surface of a particulate property modifier to provide reactive metal sites on the surface and (b) chemically bonding a surfactant to the surface at the reactive metal sites.

The present invention additionally provides a method of treating a pigment material. This method comprises the steps of: (a) metal ion activating the surface of the pigment material to provide reactive metal sites on the surface and (b) chemically bonding a surfactant to the surface at the reactive metal sites. The pigment material used in this embodiment of the inventive method is preferably a titanium dioxide pigment material.

The present invention further provides a method of removing a particulate material from an aqueous medium. This method comprises the steps of: (a) metal ion activating the surface of the particulate material to provide reactive metal sites on the surface; (b) adding a surfactant to the aqueous medium; (c) allowing the surfactant to chemically bond to the surface at the reactive metal sites; and (d) allowing the particulate material to flocculate.

The present invention also provides a method of altering the porosity of a nonparticulate porous material. This method comprises the steps of: (a) metal ion activating at least one surface of the porous material to provide reactive metal sites on the surface and (b) chemically bonding a surfactant to the surface at the reactive metal sites.

The present invention additionally provides a method of dispersing aggregate in asphalt. This method comprises the steps of: (a) metal ion activating the surface of the aggregate to provide reactive metal sites on the surface; (b) chemically bonding a surfactant to the surface at the reactive metal sites; and (c) mixing the aggregate with the asphalt.

Further objects, features, and advantages of the present invention will be readily apparent to those skilled in the art upon reference to the accompanying drawings and upon reading the following description of the preferred embodiments.

DESCRIPTION OF THE PREFERRED EMBODIMENTS

Figure 2:
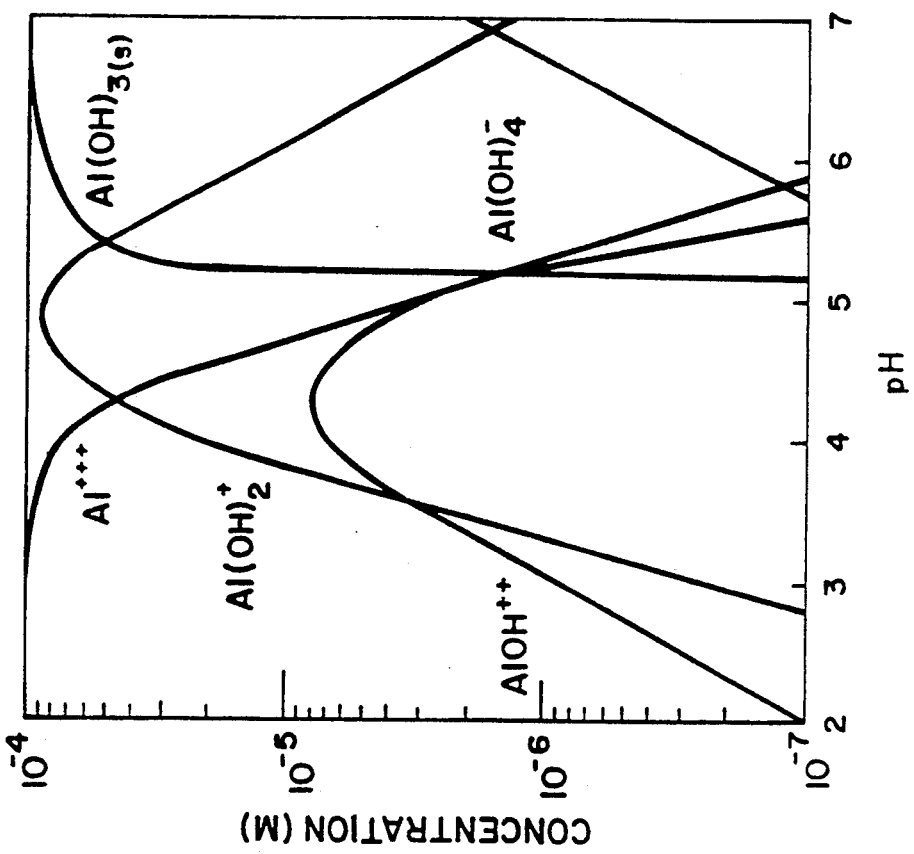
FIG. 2 is a semi-logarithmic concentration diagram for the hydrolysis of aluminum ion. The total aluminum concentration in FIG. 1 is $1.0 \times 10^{-4}$ molar.

In each embodiment of the method of the present invention, the surface of a substrate material is, or has been, treated in order to increase the hydrophobicity of the substrate material. The substrate surface is preferably treated by a method comprising the steps of: (a) metal ion activating the substrate surface to provide reactive metal sites on the surface and (b) chemically bonding a surfactant to the substrate surface at the reactive metal sites. In order to further increase the hydrophobicity of the substrate material, the inventive method can optionally include the step of adsorbing an uncharged hydrocarbon on the hydrophobic moiety of the surfactant.

The surface of the substrate material used in the present invention must simply be composed of a material which will provide sites for adsorbing activating metal ions. Consequently, the surface of the substrate can be composed of almost any material which adsorbs hydrogen ions or hydroxyl ions when exposed to water. Examples of substrate materials preferred for use in the present invention include oxides, silicates, sulfides, sulfates, and carbonates. Since metal surfaces typically include thin oxide layers, metal surfaces are also particularly well suited for use in the present invention.

Examples of specific substrates preferred for use in the present invention include: pigmentary materials such as titanium dioxide, iron oxide, nickel titanate, antimony oxide, lead chromate, zinc oxide, and cadmium sulfide; particulate property modifiers used in polymer compositions (e.g., fiberglass, ceramic particles, colloidal materials, fire retardants such as aluminum trihydrate and magnesium hydroxide, calcium carbonate, and zinc oxide); absorbents (e.g., zeolites); rock aggregates; nonparticulate metallic materials; and porous solid materials such as ceramic membranes.

The inventive method is particularly well suited for surface treating titanium dioxide pigments. Essentially any type of titanium dioxide pigment can be used as a substrate material in the inventive method. Examples of titanium dioxide pigment materials suitable for use in the inventive method include: plastics-grade titanium dioxide pigments; oil-based paint-grade titanium dioxide pigments; ultrafine titania having a particle size of less than about 0.15 micrometers; and hydrous metal oxide coated titanium dioxide pigments.

In the present invention, metal ion activation of the substrate surface is achieved by exposing the surface to an aqueous medium containing hydrolyzed metal ions. As used herein and in the claims, the term "metal ion" refers to an ion selected from the group consisting of: metal ions, metal oxycations, hydroxy metal cations, and hydrous metal cations. The metal ions used in the metal ion activation step of the inventive method are preferably: divalent, trivalent, or tetravalent metal ions; divalent, trivalent, or tetravalent metal oxycations; divalent, trivalent, or tetravalent hydroxy metal cations; divalent, trivalent, or tetravalent hydrous metal cations; or a combination thereof.

Examples of metal ions suitable for use in the inventive method include the alkaline earth metal ions $Mg^{+2}$, $Ca^{+2}$, $Sr^{+2}$, and $Ba^{+2}$ and combinations thereof. Examples of other metal ions preferred for use in the inventive method include $Zn^{+2}$, $Cd^{+2}$, $Pb^{+2}$, $Al^{+3}$, $ZrO^{+2}$, $Fe^{+2}$, $Fe^{+3}$, $Mn^{+2}$, $Cu^{+2}$, $Ni^{+2}$, $Co^{+2}$, $Cr^{+3}$, $VO^{+2}$, $Ce^{+2}$, $Ce^{+4}$, and combinations thereof. When the inventive method is used to surface treat colorless or white pigments or opacifiers, colorless aqueous metal ions such as $Mg^{+2}$, $Ca^{+2}$, $Sr^{+2}$, $Ba^{+2}$, $Cd^{+2}$ $Pb^{+2}$, $Al^{+3}$, and $Zr^{+2}$ are preferably used In accordance with the metal ion activation step of the inventive method, a compound containing the desired metal ion (e.g., a $Mg^{+2}$ ion) is dissolved in the aqueous medium. Once dissolved in the aqueous medium, the metal ion hydrolyzes to form a hydroxy-metal complex. For example, $Mg^{+2}$ ions added to the aqueous medium hydrolyze as follows:

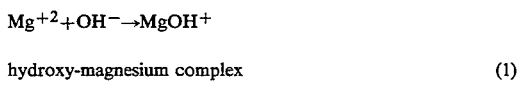

hydroxy-magnesium complex (1)

Next, the hydroxy-metal complex adsorbs onto the substrate surface at an appropriate site (e.g., at a hydrated alumina or hydrated titania site on the surface of an alumina-containing titanium dioxide pigment or at a hydrated alumina site on the surface of a hydrous alumina-coated titanium dioxide pigment) in the following manner to provide a reactive metal site on the substrate surface to which a surfactant molecule can be chemically bonded.

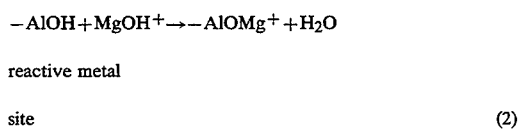

reactive metal site (2)

During the metal ion activation step of the inventive method and also preferably during the surfactant bonding step of the inventive method, the pH of the aqueous medium is preferably maintained within the range of about ±4 of the pH value at which the concentration in the aqueous medium of soluble hydrolyzed metal ions is maximized. More preferably, the pH of the aqueous medium is maintained during the metal ion activation step, and also preferably during the surfactant bonding step, within the range of about ±2 of the pH value at which the concentration of hydrolyzed metal ions is maximized but below the pH value at which the metal ions begin to substantially precipitate. Most preferably, the pH of the aqueous medium is maintained during the metal ion activation step, and also preferably during the surfactant bonding step, at about the value at which the concentration in the aqueous medium of hydrolyzed metal ions is maximized without the occurrence of a substantial amount of metal ion precipitation.

Figure 1:
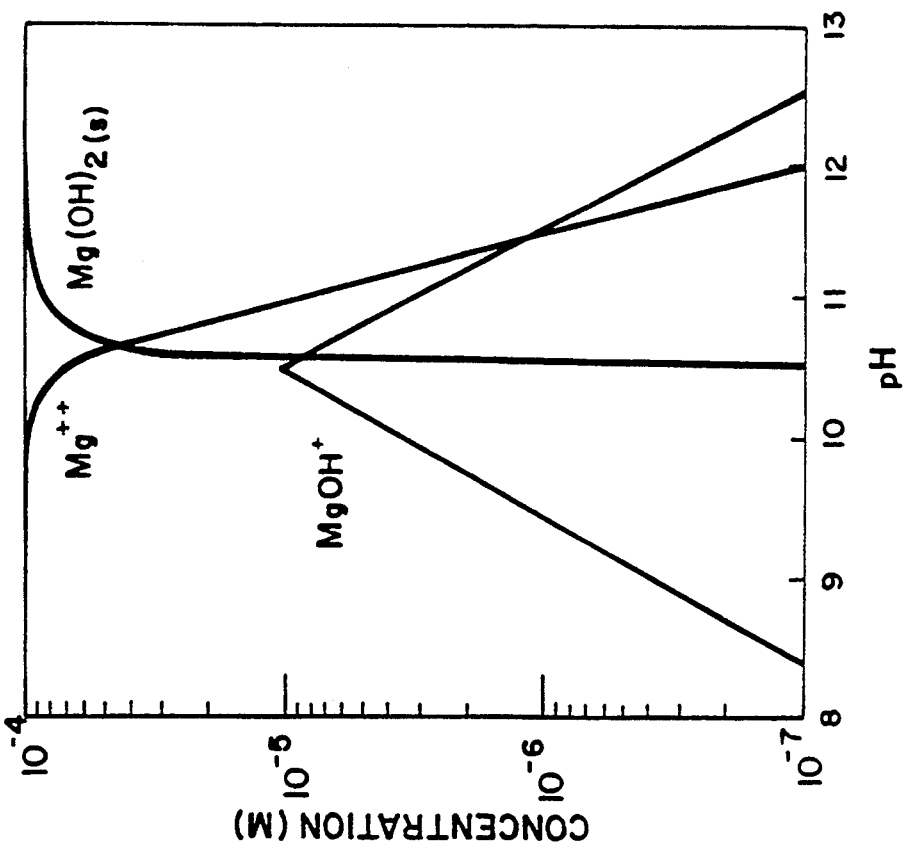
FIG. 1 is a semi-logarithmic concentration diagram for the hydrolysis of magnesium ion. The total magnesium concentration in FIG. 1 is $1.0 \times 10^{-4}$ molar.

As will be appreciated by those skilled in the art, the aqueous medium pH at which the concentration of hydrolyzed metal ions is maximized can generally be determined using a semi-logarithmic concentration diagram. FIG. 1 provides an aqueous medium concentration diagram for magnesium ion. FIG. 1 was generated assuming a total magnesium concentration in the aqueous medium of $1.0 \times 10^{-4}$ molar. As indicated in FIG. 1, the concentration of the soluble hydrolyzed Mg ion (i.e., $MgOH^+$) in the aqueous medium is maximized at a pH of about 10.4. FIG. 1 also indicates that, in order to avoid the precipitation of the solid species $Mg(OH)_2$, the pH of the aqueous medium should be maintained below about 10.5.

An aqueous medium concentration diagram for aluminum is provided in FIG. 2. FIG. 2 was generated assuming a total aluminum concentration in the aqueous medium of $1.0 \times 10^{-4}$ molar. As indicated in FIG. 2, the concentration of soluble hydrolyzed aluminum ions in the aqueous medium is maximized at a pH of about 4.8. As also indicated in FIG. 2, the pH of the aqueous medium must be maintained at or below about 5.2 in order to avoid the precipitation of the solid species $Al(OH)_3$.

When aluminum ions are used in the metal ion activation step of the inventive method, the pH of the aqueous medium is (a) preferably maintained in the range of from about 3.8 to about 5.2 and (b) most preferably maintained at about 4.8.

The acids preferred for use in the inventive method for adjusting and controlling the pH of the aqueous medium are mineral acids and combinations of mineral acids. Specific examples of acids preferred for use as pH controlling agents in the inventive method include: halogen acids such as hydrochloric acid, hypochloric acid, chloric acid, and perchloric acid; sulfuric acid; sulfurous acid; and nitric acid. The acids most preferred for use in the inventive method as pH controlling agents are sulfuric acid and hydrochloric acid.

Examples of bases preferred for use in the inventive method for adjusting and controlling the pH of the aqueous medium are hydroxides, carbonates, oxides, and amines. Specific examples of bases preferred for use as pH controlling agents in the inventive method include: hydroxides of sodium, potassium, lithium, calcium, magnesium, barium, or strontium; ammonium hydroxide; ammonium carbonate; carbonates of sodium, potassium, lithium, calcium, magnesium, barium, or strontium; oxides of sodium, potassium, lithium, calcium, magnesium, barium, or strontium; and the hydroxide, carbonate, or oxide of the activating metal ion itself.

In one embodiment of the inventive method, a separate metal ion source is added to the aqueous medium to provide the hydrolyzable metal ions necessary for metal ion activation. Examples of separate metal ion sources suitable for use in the inventive method include: metal chlorides; metal sulfates; hydrates of metal chlorides or metal sulfates; and other compounds, such as hydroxides, oxides, or carbonates, which will dissolve in acids or bases to yield hydrolyzable metal ions. The amount of metal ion source added to the aqueous medium is preferably an amount sufficient to provide from about 0.01 to about 100 monolayers of adsorbed metal ion coverage on the surface of the substrate. Most preferably, the amount of metal ion source added to the aqueous medium is an amount sufficient to provide from about 0.1 to about 5 monolayers of adsorbed metal ion coverage on the surface of the substrate.

In another embodiment of the inventive method, at least a portion of the metal ions used in the metal ion activation process are provided by the substrate itself. In this embodiment, the substrate (e.g., a hydrous alumina-containing titanium dioxide pigment) contains a material (e.g., hydrous alumina) which will yield hydrolyzable metal ions (e.g., $Al^{+3}$ ions) when exposed to the aqueous medium. Specifically, when the substrate is placed in or otherwise exposed to the aqueous medium, hydrolyzable metal ions are dissolved from the substrate surface. Once dissolved in the aqueous medium, the metal ions hydrolyze and then readsorb at hydrated sites (e.g., hydrated titania and alumina sites) on the substrate surface.

In yet another embodiment of the inventive method, at least a portion of the metal ions used in the metal ion activation process are provided by a coating which has been placed on the substrate surface. For example, when an alumina-coated titanium dioxide pigment is placed in or otherwise exposed to an aqueous medium, some $Al^{+3}$ ions are dissolved from the alumina coating. Once dissolved in the aqueous medium, the $Al^{+3}$ ions hydrolyze and then readsorb at hydrated alumina sites on the alumina coating.

During the metal ion activation step of the inventive method, the aqueous medium and substrate material are preferably maintained at a temperature which maximizes the adsorption of metal ions on the surface of the substrate. Consequently, in most cases, the aqueous medium and substrate material are preferably maintained during the metal ion activation step at a temperature in the range of from about 5° C. to about 100° C. Typically, the aqueous medium and substrated material are most preferably maintained during the metal ion activation step at a temperature in the range of from about 20° C. to about 70° C.

As indicated above, the surface of the substrate used in the inventive method can be exposed to the aqueous medium by placing the substrate (or at least the surface of the substrate) in the aqueous medium. For example, when the substrate is a titanium dioxide pigment or some other type of particulate property modifier used in polymer compositions, the substrate material can be exposed to the aqueous medium by mixing the substrate material with the aqueous medium to form a slurry.

If a separate metal ion source is used, the metal ion source can be added to the aqueous medium before, simultaneously with, or after the addition of the substrate material. The surfactant used in the inventive method is preferably added to the aqueous medium simultaneously with or after the addition of the metal ion source. The surfactant is most preferably added to the aqueous medium after the addition of both the substrate material and the metal ion source. In order to encourage the adsorption of hydrolyzed metal ions on the substrate surface, the substrate slurry is preferably stirred, or otherwise agitated, during the metal ion activation step. Acidic and/or basic pH controlling agents are preferably added to the aqueous medium as necessary throughout the metal ion activation step in order to maintain an appropriate pH, as discussed hereinabove.

A nonparticulate substrate material (e.g., a metallic object) can be exposed to an aqueous medium having an appropriate pH in accordance with the inventive method by spraying the aqueous medium onto the surface of the substrate. If desired or necessary, this aqueous medium can be an aqueous medium which has a metal ion source dissolved therein. After the nonparticulate substrate is thus exposed to the aqueous medium, the substrate can be sprayed with a suitable surfactant solution. Alternatively, the nonparticulate substrate can be treated in accordance with the inventive method by simply immersing the substrate in a suitable aqueous medium containing the metal ion and then immersing the substrate in a suitable surfactant solution or by adding a surfactant to the metal-ion combining solution after the metal ion has adsorbed on the metal surface.

Prior to treating the surface of a nonparticulate metal material in accordance with the inventive method, the surface is preferably cleaned in order to remove oil, grease, and other impurities. The surface of the metal can be cleaned using generally any technique commonly used for cleaning metal surfaces. Examples of techniques suitable for cleaning metal surfaces include detergent washing, solvent washing, vapor degreasing, sonic degreasing, etc.

In some cases, a sufficient amount of water is retained on the surface of a substrate material to provide an aqueous medium suitable for metal ion activation and surfactant bonding. As will be understood by those skilled in the art, oxides, silicates, and other substrate materials adsorb water through hydrogen bonding. Water can thus be adsorbed on the surfaces of such substrates by simply contacting the substrates with water or by exposing the substrates to atmospheric moisture.

Where a sufficient amount of water is retained on the surface of the substrate material to provide a suitable aqueous medium for the present invention, the metal ion activation and surfactant bonding steps of the inventive method can be conducted by simply mixing a metal ion source and a surfactant with the substrate material. For example, in the case of a rock aggregate material which is to be dispersed in an asphalt material, the metal ion activation and surfactant bonding steps of the inventive method can be performed by tumbling the aggregate with a metal ion source in a cement-type mixer while spraying in a suitable surfactant. After the metal ion source and surfactant are thoroughly mixed with the aggregate, the aggregate is mixed with the asphalt material.

During the surfactant bonding stage of the inventive method, a surfactant is added to the aqueous medium and then allowed to adsorb on the substrate surface at the reactive metal sites provided by the metal ion activation process. As indicated above, the surfactant can be added to the aqueous medium simultaneously with or after the addition of a metal ion source (assuming a separate metal ion source is used). However, the surfactant is preferably added to the aqueous medium (a) after the substrate material has been added, (b) after any separate metal ion source has been added, and (c) after the metal ion activation process has been substantially completed.

The surfactant is preferably added to the aqueous medium in an amount sufficient to provide from about one hundredth of a monolayer to about one hundred monolayers of the surfactant over the total surface of the substrate. The surfactant is most preferably added to the aqueous medium in an amount sufficient to provide from about one tenth to about five monolayers of the surfactant over the entire surface of the substrate.

During the surfactant bonding stage of the inventive method, the temperature and pH of the aqueous medium are preferably maintained in the same preferred ranges as discussed above for the metal ion activation stage of the inventive method. Further, the aqueous medium and the substrate material are preferably stirred or otherwise agitated, where possible, during the surfactant bonding stage in order to facilitate the surfactant bonding process.

Examples of surfactants preferred for use in the inventive method include: linear and branched carboxylic acids and acid salts having from about 4 to about 30 carbon atoms; linear and branched alkyl sulfonic acids and acid salts having from about 4 to about 30 carbon atoms; linear alkyl benzene sulfonate wherein the linear alkyl chain includes from about 4 to about 30 carbon atoms; sulfosuccinates; phosphates; phosphonates; phospholipids; and mixtures thereof. Specific examples of surfactants most preferred for use in the inventive method include: sodium stearate; octadecanoic acid; hexadecyl sulfonate; lauryl sulfate; sodium oleate; and combinations thereof.

The surfactant used in the inventive method forms a stable compound with the metal ion which is adsorbed onto the substrate surface during the metal ion activation stage. As a result, the surfactant is firmly bonded to the substrate surface. For example, given a carboxylic acid surfactant and a substrate surface having reactive metal sites of the type formed above in reaction (2), the carboxylic acid surfactant strongly bonds to the substrate surface in the following manner:

$$-AlOMg^+ + RCOO^- \rightarrow -AlOMgOOCR \quad (3)$$

wherein R represents a long-chained, hydrophobic, hydrocarbon moiety.

In order to further increase the hydrophobicity of the substrate material treated by the inventive method, the inventive method can optionally include the additional step of adsorbing an uncharged, long-chained (i.e., having a linear or branched hydrocarbon chain with from about 4 to about 30 carbon atoms) hydrocarbon on the hydrophobic moiety presented by the surfactant. Examples of uncharged, long-chained hydrocarbons preferred for use in the inventive method include long-chained alcohols and long-chained paraffinic compounds.

The uncharged, long-chained hydrocarbon used in the uncharged hydrocarbon adsorption step is preferably added to the aqueous medium after the surfactant has bonded to the substrate surface. During the uncharged hydrocarbon adsorption step, the temperature and pH of the aqueous medium are preferably maintained in the same preferred ranges as discussed above for the metal ion activation and surfactant bonding stages of the inventive method. Additionally, the substrate material and the aqueous medium are preferably stirred or otherwise agitated, where possible, during the uncharged hydrocarbon adsorption step in order to facilitate both the rapid dispersion of the uncharged hydrocarbon in the aqueous medium and the rapid adsorption of the uncharged hydrocarbon on the hydrophobic moiety of the surfactant.

When a titanium dioxide pigment material, or some other particulate property modifier of the type added to polymeric compositions, is treated in accordance with the inventive method using the above-described substrate slurry technique, the treated substrate material can be recovered from the aqueous medium by filtration. Following filtration, the treated substrate material can be dried using generally any means (e.g., heating in an oven) commonly used in the art for drying particulate materials. Alternatively, the treated filler material can be simultaneously recovered from the aqueous medium slurry and dried using a common spray drying technique. When using a typical spray-drying technique, the substrate slurry will be sprayed into the heated gas generated in a fired, spray-drying chamber. In the spray-drying chamber, the water portion of the slurry evaporates and the dry substrate product thus produced flows out of the chamber along with the drying chamber gas stream. The dried substrate can be recovered from the gas stream using, for example, a cyclone or a bag filter.

After dewatering and drying, the treated particulate material can be milled as necessary to break up agglomerates formed during the treatment and recovery processes.

As indicated above, a treated particulate property modifier produced in accordance with the present invention can be dispersed in a polymeric material to provide a polymer composition having improved properties. Due to (1) the strong bond formed between the surfactant and the surface of the particulate material and (2) the relatively strong van der Waals' forces which will exist between the polymeric material and the hydrophobic moiety presented by the surfactant, the treated particulate material produced in accordance with the inventive method is more readily dispersed in the polymeric material. Additionally, since (1) particulate property modifiers typically have higher elastic moduli and higher yield strengths than the plastics in which they are incorporated and (2) the present invention improves the bond strength between the plastic matrix and the particulate material, the present invention increases the overall strength of the polymer composite product.

Examples of polymeric materials preferred for use in the present invention for forming polymer composites include: polystyrene; polyethylene; polyvinyl chloride; polypropylene; acrylonitrile-butadiene-styrene; polyphenylene sulfide; polyphenylene oxide; nylon; polyethylene terephthalate; epoxies; alkyl urea formaldehyde; and combinations thereof.

Treated particulate property modifiers produced in accordance with the present invention can be dispersed in polymeric materials using generally any technique commonly used in the art for incorporating particulate materials in polymer compositions. For example, a treated particulate material produced in accordance with the inventive method can be dispersed in a polymeric material of the type just described using a Bandbury mixer, a two-roll mill, a high-shear mixer, or a GEL-O-MAT® mixer.

As also indicated above, the present invention provides a method of removing a particulate material from an aqueous medium. This embodiment of the inventive method comprises the steps of: (a) metal ion activating the surface of the particulate material to provide reactive metal sites on the surface of the particulate material; (b) adding a surfactant to the aqueous medium; (c) allowing the surfactant to chemically bond to the surface at the reactive metal sites; and (d) allowing the particulate material to flocculate. The metal ion activation step of this embodiment of the inventive method is generally conducted in the same manner as discussed hereinabove for metal ion activating particulate property modifiers. After the particulate material has flocculated in accordance with step (d), the particulate material can be removed from the aqueous medium by, for example, settling, sedimentation, filtration, froth flotation, or a combination of these methods.

As will be apparent to those skilled in the art, the embodiment of the inventive method just discussed has substantial environmental utility. Due to their small size and electrical surface charges, particulate materials are often difficult to remove from waste water streams and other aqueous media. However, when treated in accordance with inventive method, these particulate materials flocculate and are thus more readily removable from the aqueous media.

As further indicated above, the present invention provides a method of altering the porosity of a porous material (e.g., a ceramic membrane or a zeolite material). In this embodiment of the inventive method, the porous material is surface treated using generally the same metal ion activation and surfactant bonding procedures used in the inventive method for surface treating other nonparticulate substrates. In addition to modifying the pore diameter of the substrate material, this embodiment of the inventive method operates to increase the hydrophobicity of the external surfaces and of the pore surfaces of the porous material.

The following examples are provided in order to further illustrate the present invention.

EXAMPLE I 0.05 mole of magnesium chloride hexahydrate was added to 1 liter of water at room temperature (22° C.). The pH of the resulting solution was adjusted to a value of 10.24 using one normal ammonium hydroxide. Next, 200 grams of CR-834 plastics grade pigment manufactured by Kerr-McGee Corporation were added to the magnesium chloride solution. CR-834 is a titanium dioxide pigment coated with hydrous alumina. CR-834 pigment has a surface area of about 9.5 $m^2/g$ and an alumina content of about 1.5 weight percent.

Following the addition of the CR-834 pigment, the resulting slurry was agitated for about 10 minutes. The pH of the slurry was then readjusted to a value of about 10.24 using one normal ammonium hydroxide. Next, the slurry was agitated for an additional 10 minutes to allow the hydroxy-magnesium complex obtained from the magnesium chloride hexahydrate to adsorb on the pigment surface. At the end of the hydroxy-magnesium complex adsorption process, the magnesium content of the aqueous slurry medium was 0.23 molar. Thus, about 55 weight percent of the magnesium originally present in the aqueous slurry medium adsorbed on the pigment surface during the hydroxy-magnesium complex adsorption process.

Following the hydroxy-magnesium complex adsorption process, 0.05 mole of sodium stearate was added to the pigment slurry. The stearate ions provided by the sodium stearate adsorbed on the pigment material. To assist the stearate adsorption process, the slurry was agitated for 10 minutes following sodium stearate addition.

At the end of the stearate adsorption process, the treated pigment material was recovered from the pigment slurry by filtration. The filtrate separated from the treated pigment material had a pH of 9.91. The treated pigment material recovered by the filtration process was dried in an oven at 100° C. for three hours. Next, the treated pigment was passed through a 325-mesh sieve in order to reduce the size of agglomerates formed during the treatment process. The final weight of the treated pigment product was 204.8 grams.

EXAMPLE II

The process set forth in Example I was repeated with the exception that 0.01 mole of magnesium chloride hexahydrate and 0.01 mole of sodium stearate were used. At the end of the hydroxy-magnesium complex adsorption process, the magnesium content of the aqueous medium was only $6.7 \times 10^{-5}$ molar. Thus, at the end of the hydroxy-magnesium complex adsorption process, 99.3 weight percent of the magnesium originally added to the aqueous medium adsorbed on the pigment surface.

At the end of the stearate adsorption process, the pH of the pigment slurry was readjusted to a value of about 10.26 using dilute sulfuric acid. The treated pigment product was then removed from the slurry by filtration and dried in an oven at 100° C. for 15 hours. After drying, the treated pigment product was passed through a 325-mesh screen in order to reduce the size of agglomerates formed during the treatment process. The weight of the final pigment product was 192.4 grams.

EXAMPLE III 200 grams of CR-834 pigment was again treated in accordance with the present invention. However, in this procedure, the hydrous alumina coating of the CR-834 pigment was used as the metal ion source for the metal ion activation step.

First, the pH of one liter of water was adjusted to a value of 5.0 using dilute sulfuric acid. Next, the CR-834 pigment was added to the water. The resulting slurry was agitated at room temperature for 10 minutes. The pH of the slurry was then readjusted to a value of 5.0 using dilute sulfuric acid. At the end of this process, the aqueous slurry medium had an aluminum concentration of less than $7.5 \times 10^{-6}$ molar, thus indicating that the hydroxy-aluminum complex yielded by the alumina coating strongly adsorbs on the surface of the pigment material.

After the pH of the pigment slurry was readjusted to a value of 5.0, 0.01 mole of sodium stearate was added to the slurry. The slurry was then agitated for 10 minutes. Subsequently, the pH of the slurry was again adjusted to a value of 5.0 using dilute sulfuric acid.

The treated pigment material thus produced was recovered from the slurry by filtration and then dried in an oven at 100° C. for 15 hours. Next, the dried material was passed through a 325-mesh sieve in order to reduce the size of agglomerates produced during the treatment process. The final weight of the dried pigment product was 195.5 grams.

The dispersibility of each of the treated pigments produced in Examples I, II, and III was evaluated using a high-load polystyrene dispersibility test. In this test, the pigment material is mixed with polystyrene in a BRABENDER mixer. Initially, as a pigment material is mixed with polystyrene in the BRABENDER mixer, the torque required for mixing rises as the plastic melts and then wets the pigment material. However, after the pigment is incorporated in the polystyrene, the torque required for mixing drops and attains a steady-state value. The lower the steady-state torque value achieved for a given pigment material, the more dispersible the pigment is in the polystyrene medium.

In addition to the treated pigment materials produced in Examples I, II, and III, CR-836 plastics-grade pigment material manufactured by Kerr-McGee Corporation and another typical plastics-grade pigment material were evaluated using the same high-load polystyrene dispersibility test.

The results of these high-load polystyrene dispersibility tests are provided in Table 1. As indicated in Table 1, the dispersibility characteristics of the treated pigment materials produced in Examples I, II, and III were significantly better than the dispersibility characteristics of CR-836 and of the other commercial plastics-grade pigment tested. The treated pigment material produced in Example 1 exhibited particularly desirable dispersibility characteristics. Additionally, the treated pigment materials of Examples I, II, and III provided filled polystyrene compositions which were significantly easier to clean out of the laboratory equipment used in the high-load polystyrene dispersibility test than did the untreated commercial plastics-grade pigment materials tested. Thus, in addition to enhancing dispersibility, the surface treatment method of the present invention apparently imparts other desirable properties to pigment materials treated in accordance therewith.

TABLE I

RESULTS OF HIGH-LOAD POLYSTYRENE DISPERSIBILITY TEST FOR TREATED PIGMENTS OF EXAMPLES I, II AND III

| Sample Identification | Steady State Torque (M · G) | Final Mixing Temperature (°C.) |
|---|---|---|
| Example I | 1,325 | 172 |
| Example II | 1,484 | 176 |
| Example III | 1,519 | 177 |
| Plastics-Grade Pigment | 1,581 | 176 |
| CR-836 | 1,556 | 174 |

EXAMPLE IV

As indicated in Table II, nine additional surface treated pigment products (i.e., pigment products 4-1 through 4-9) were prepared in accordance with the method of the present invention. The pigment material treated in each case was a titania-alumina pigment. A titania-alumina pigment is a titanium dioxide pigment having a small amount of alumina present in the pigment lattice in order to reduce photoactivity. Products 4-1, 4-2, and 4-3 were produced from an uncoated titania-alumina pigment material. Products 4-4, 4-5, and 4-6 were produced from a commercial titania-alumina pigment material having a hydrous silica coating covered by a hydrous alumina coating. Products 4-7, 4-8, and 4-9 were produced from a commercial titania-alumina pigment having only a hydrous alumina coating. As also indicated in Table II, products 4-1, 4-4, and 4-7 were prepared using $Al^{+3}$ ions in the metal ion activation step, products 4-2, 4-5, and 4-8 were prepared using $Mg^{+2}$ ions in the metal ion activation step, and products 4-3, 4-6, and 4-9 were prepared using $Zn^{+2}$ ions in the metal ion activation step. Further, the surfactant used to produce products 4-1, 4-6, and 4-8 was sodium stearate, the surfactant used to produce products 4-2, 4-4, and 4-9 was sodium lauryl sulfate, and the surfactant used to produce products 4-3, 4-5, and 4-7 was sodium hexadecyl sulfonate.

In each case wherein $Mg^{+2}$ or $Zn^{+2}$ ions were used in the metal ion activation step, a metal ion salt (i.e., magnesium chloride in cases involving the use of $Mg^{+2}$ ions and zinc chloride in cases involving the use of $Zn^{+2}$ ions) was added to a slurry composed of 100 g of pigment material dispersed in 300 g of water at room temperature. The pH of the slurry was then adjusted to a value at which the concentration of the activating hydroxy-metal complex having one hydroxide group was maximized. In cases involving the use of $Mg^{+2}$ ions, the pH of the slurry was adjusted to a value of 10.2. In cases involving the use of $Zn^{+2}$ ions, the pH of the slurry was adjusted to a value of 7.0. The pH of the slurry was adjusted in each case using either 5.0 molar sodium hydroxide or 1.0 molar sulfuric acid as necessary. Following the pH adjustment, 0.005 mole of a surfactant (i.e., sodium stearate, sodium lauryl sulfate, or sodium hexadecyl sulfonate) was added to the slurry. The slurry was then agitated for 10 minutes. The pH was then readjusted to the optimum value indicated above. Next, the slurry was agitated for an additional 30 minutes and then filtered. The filtered product was dried in an oven at 110° C. for 12 hours and then micropulverized.

In each case involving the use of $Al^{+3}$ ions, the $Al^{+3}$ ions were provided by the pigment itself. Specifically, in each case involving the use of $Al^{+3}$ ions, a slurry composed of 100 g of pigment material dispersed in 300 g of water at room temperature was prepared. The pH of the slurry was then adjusted to a value of about 4.5 (i.e., a pH at which the concentration of soluble hydrolyzed aluminum ions in the aqueous slurry medium is substantially maximized) using sulfuric acid. Next, 0.005 mole of a surfactant (i.e., sodium stearate, sodium lauryl sulfate, or sodium hexadecyl sulfonate) was added to the slurry and the slurry was agitated for 10 minutes. The pH of the slurry was then readjusted to a value of about 4.5 and the slurry was agitated for an additional 30 minutes. Next, the treated pigment product was removed from the slurry by filtration, dried in an oven at 110° for 12 hours, and then micropulverized.

The dispersibility of each of the pigment products produced in this Example was evaluated using the same high-load polystyrene dispersibility test described above. In each case, mixing torque and final mixing temperature were determined using 75 parts by weight of the pigment material per 25 parts by weight polystyrene. For comparison purposes, the dispersibility of a typical plastics-grade pigment was also tested. The results of these tests are provided in Table II.

TABLE II

DISPERSIBILITY CHARACTERISTICS OF TREATED PIGMENTS 4-1 THROUGH 4-9

| Pigment | Pigment Coating | Activating Cation | Surfactant | Mixing Torque (M · G) | Final Mixing Temp. (°C.) |
|---|---|---|---|---|---|
| 4-1 | None | $Al^{+3}$ | Stearate | 1619 | 177 |
| 4-2 | None | $Mg^{+2}$ | Lauryl Sulfate | 1737 | 178 |
| 4-3 | None | $Zn^{+2}$ | Hexadecyl Sulfonate | 1683 | 178 |
| 4-4 | Hydrous Silica/ Hydrous Alumina | $Al^{+3}$ | Lauryl Sulfate | 1681 | 192 |
| 4-5 | Hydrous Silica/ Hydrous Alumina | $Mg^{+2}$ | Hexadecyl Sulfonate | 1794 | 177 |
| 4-6 | Hydrous Silica/ Hydrous Alumina | $Zn^{+2}$ | Stearate | 1617 | 183 |
| 4-7 | Hydrous Alumina | $Al^{+3}$ | Hexadecyl Sulfonate | 1608 | 181 |
| 4-8 | Hydrous Alumina | $Mg^{+2}$ | Stearate | 1677 | 181 |
| 4-9 | Hydrous Alumina | $Zn^{+2}$ | Lauryl Sulfate | 1770 | 184 |
| Plastics-Grade Pigment | | | | 1639 | 175 |

The results presented in Table II indicate that stearate and hexadecyl sulfonate are effectively used in the method of the present invention for improving the dispersibilities of pigment materials. The data presented in Table II also indicate that alumina present in the pigment lattice or in an alumina coating constitutes an effective metal ion source for the metal ion activation step of the inventive method.

EXAMPLE V

Ten treated pigment products (i.e., pigment products 5-1 through 5-10) were prepared in accordance with the inventive method using an uncoated titania-alumina pigment of the type described in Example IV and using $Al^{+3}$ ions derived from the pigment. Pigment products 5-1 through 5-10 were prepared in generally the same manner as above-described pigment products 4-1, 4-4, and 4-7. However, in the production of products 5-1 through 5-10, surfactant concentration, slurry pH, and slurry temperature were varied as indicated in Table III. Additionally, each of products 5-1 through 5-10 was recovered and dried by spray drying in a fired, spray drying chamber.

The dispersibility of each of products 5-1 through 5-10 was evaluated using the same high-load polystyrene dispersibility test used in Example IV. For comparison purposes, the dispersibility of a typical plastics-grade pigment was also tested. The results of these tests are provided in Table III.

from polymer degradation caused by the necessity of using high mixing temperatures.

Pigment Product 6-1

Pigment product 6-1 was prepared by: (1) adding 0.05 moles of magnesium chloride to 600 ml of water at room temperature; (2) adjusting the pH of the resulting solution to a value of 10.2 using 5N sodium hydroxide; (3) adding 200 g of ultrafine titania; (4) agitating the resulting titania slurry for 30 minutes; (5) readjusting the pH of the titania slurry to a value of 10.2 using 5N sodium hydroxide; (6) adding 0.05 mole of sodium stearate dissolved in 150 ml of 80° C. water; (7) agitating the titania slurry for 15 minutes; (8) readjusting the pH of the slurry to a value of 10.2 using 5N sodium hydroxide; and then (9) agitating the slurry for an additional 15 minutes. Pigment product 6-1 was recovered and dried

TABLE III

PRODUCTION PARAMETERS AND DISPERSIBILITY CHARACTERISTICS OF TREATED PIGMENT PRODUCTS 5-1 THROUGH 5-10

| Product | Surfactant | Surfactant Concentration (Moles/100 g of Pigment) | pH | Slurry Temp (°C.) | Mixing Torque (M · G) | Final Mixing Temp (°C.) |
| --- | --- | --- | --- | --- | --- | --- |
| 5-1 | Stearate | 0.005 | 4.5 | 25 | 1620 | 179 |
| 5-2 | Stearate | 0.005 | 10 | 60 | 1595 | 178 |
| 5-3 | Stearate | 0.02 | 4.5 | 60 | 1142 | 161 |
| 5-4 | Stearate | 0.02 | 10 | 25 | 1556 | 178 |
| 5-5 | Oleate | 0.005 | 4.5 | 60 | 1509 | 176 |
| 5-6 | Oleate | 0.005 | 10 | 25 | 1554 | 176 |
| 5-7 | Oleate | 0.02 | 4.5 | 25 | 1041 | 158 |
| 5-8 | Oleate | 0.02 | 10 | 60 | 1626 | 179 |
| 5-9 | Stearate | 0.0125 | 7.2 | 42 | 1533 | 171 |
| 5-10 | Oleate | 0.0125 | 7.2 | 42 | 1473 | 176 |
| Plastics-Grade Pigment | | | | | 1543 | 176 |

Statistical analysis of the data provided in Table III indicates that surfactant concentration and pH have a significant effect on torque and temperature at a 99% confidence level. The pigment products produced using a surfactant concentration of 0.02 mole/100 g of pigment and a pH of 4.5 exhibited exceptional dispersibility characteristics. The result concerning pH is consistent with the above-discussed predictions based on the use of the semilogarithmic concentration diagram for the hydrolysis of aluminum (FIG. 2). Reaction temperature (25° C. or 60° C.) and surfactant configuration (stearate or oleate), on the other hand, did not significantly affect the torque and temperature results obtained.

EXAMPLE VI

Four pigment products (i.e., pigment products 6-1 through 6-4) were prepared using an ultrafine commercial titanium dioxide material. The ultrafine material was an uncoated particulate material composed of 70% by weight anatase $TiO_2$ and 30% by weight rutile $TiO_2$. The ultrafine material had a particle size of approximately 0.04 micron and a surface area of approximately 50 m$^2$/g. Further, the ultrafine titania material contained no alumina.

Ultrafine titanium dioxide material of the type used in this Example is commonly incorporated in paints and plastics to attenuate ultraviolet radiation. As will be appreciated by those skilled in the art, it has heretofore been difficult to disperse ultrafine titanium dioxide material in polyethylene. Prior attempts to incorporate ultrafine titania in polyethylene at concentrations exceeding about 10% by weight have generally yielded only yellowish resin products. The yellowish color of these resins results from poor pigment dispersion and by spray-drying the slurry in a fired, spray drying chamber. After spray drying, pigment product 6-1 had a bulk density of 0.68 g/cm$^3$. The ultrafine titania used to prepare pigment product 6-1 had a bulk density of only 0.09 g/cm$^3$.

Pigment Product 6-2

Pigment product 6-2 was prepared by mixing 200 g of ultrafine titania with 600 ml of water at room temperature to form a titania slurry. The titania slurry was then spray dried to yield a product having a bulk density of 0.75 g/cm$^3$.

Pigment Product 6-3

Pigment product 6-3 was prepared in generally the same manner as pigment product 6-1. However, pigment product 6-3 was recovered by filtration and dried in an oven at 110° C. for 12 hours. Pigment product 6-3 was then micropulverized. After micropulverizing, pigment product 6-3 had a bulk density of 0.51 g/cm$^3$.

Pigment Product 6-4

Pigment product 6-4 was prepared by: (1) mixing 200 g of ultrafine titania with 600 ml of water at room temperature to form a titania slurry; (2) recovering the titania from the slurry by filtration; (3) drying the titania in an oven at 110° C. for 12 hours; and (4) micropulverizing the dried product. After micropulverization, pigment product 6-4 had a bulk density of 0.55 g/cm$^3$.

Each of pigment products 6-1 through 6-4 was tested by dispersing 50 parts by weight of the pigment product in 50 parts by weight of a polyethylene resin having a melt index of 8.5. The pigment and resin materials were blended using a BRABENDER mixer. Steady state torque and steady state mixing temperature values were obtained for each pigment/resin mixture. Additionally, the optical properties of each pigment/resin mixture were evaluated using standard tint tone and tint strength tests. The results of these tests are provided in Table IV.

TABLE IV

PIGMENT PRODUCTS 6-1 THROUGH 6-4: DISPERSIBILITY RESULTS AND OPTICAL CHARACTERISTICS OBTAINED FROM BLENDING 50 PBW OF PIGMENT PRODUCT WITH 50 PBW OF POLYETHYLENE

| Blend Property | Pigment Product | | | |
|---|---|---|---|---|
| | 6-1[1] | 6-2[2] | 6-3[1] | 6-4[2] |
| Steady State Torque (M · G) | 1208 | 1648 | 1307 | 1789 |
| Final Mixing Temp. (°C.) | 127 | 163 | 135 | 169 |
| Solids (wt %) | 53.2 | 51.9 | 53.8 | 51.4 |
| Tint Tone | −12.77 | −13.59 | −12.50 | −13.36 |
| Tint Strength | 30.0 | 29.4 | 31.7 | 31.0 |
| Brightness[3] | 100 | 91.7 | 100.6 | 98.1 |
| Mass Tone[3] | 0.0 | 6.7 | −0.69 | 3.5 |

[1]Pigment product prepared in accordance with the present invention by activation with MgOH+ followed by stearate adsorption.
[2]Untreated pigment product.
[3]Brightness and mass tone values set at 100 and 0.0, respectively, for pigment product 6-1 with values for other pigment products being determined relative to product 6-1.

As indicated in Table IV, the pigment products treated in accordance with the present invention (i.e., pigment products 6-1 and 6-3) were much more readily dispersible in polyethylene than were untreated pigment products 6-2 and 6-4. Specifically, the torque values and mixing temperatures obtained using products 6-1 and 6-3 were much lower than the values obtained using products 6-2 and 6-4.

All of the pigment/resin compositions exhibited very good tint tone and tint strength properties. However, as indicated by the high positive mass tone values shown in Table IV, the compositions prepared using untreated products 6-2 and 6-4 were undesirably yellow in color. In contrast, the compositions prepared using products 6-1 and 6-3 were white. As indicated above, resin composition yellowing results from poor pigment dispersion and from degradation of the polyethylene resin caused by high processing temperature.

Thus, the present invention is well adapted to carry out the objects and attain the ends and advantages mentioned above as well as those inherent therein. While presently preferred embodiments have been described for purposes of this disclosure, numerous changes and modifications will be apparent to those skilled in the art. Such changes and modifications are encompassed within the spirit of this invention as defined by the appended claims.

We claim:

1. A method of forming a polymeric composition comprising the step of dispersing a treated particulate property modifier in a polymeric material, said treated particulate property modifier having been produced by a process comprising the steps of:
   (a) metal ion activating the surface of a particulate property modifier to provide reactive metal sites on said surface and
   (b) chemically bonding a surfactant to said surface at said reactive metal sites.

2. A polymeric composition formed by the method of claim 1.

3. A method as described in claim 1 wherein said polymeric material is selected from the group consisting of: polystyrene; polyethylene; polyvinyl chloride; polypropylene; acrylonitrile-butadienestyrene; polyphenylene sulfide; polyphenylene oxide; nylon; polyethylene terephthalate; epoxies; alkyl urea formaldehyde; and combinations thereof.

4. A polymeric composition formed by the method of claim 3.

5. A method of forming a polymeric composition comprising the step of dispersing a treated particulate property modifier in a polymeric material, said treated particulate property modifier having been produced by a process comprising the steps of:
   (a) metal ion activating the surface of a particulate property modifier by using hydrolyzed metal ions selected from the group consisting of: divalent, trivalent, and tetravalent metal ions; divalent, trivalent, and tetravalent metal oxycations; divalent, trivalent, and tetravalent hydroxy metal cations; divalent, trivalent, and tetravalent hydrous metal cations; and combinations thereof to provide reactive metal sites on said surface and
   (b) chemically bonding a surfactant to said surface at said reactive metal sites.

6. The method as described in claim 5 wherein said surface is metal ion activated in step (a) of said process by exposing said surface to an aqueous medium having said hydrolyzed metal ions dissolved therein.

7. The method as described in claim 6 wherein said process further comprises the step, during at least a portion of step (a), of maintaining the pH of said aqueous medium within the range of about ±2.0 of the pH value at which the concentration in said aqueous medium of said hydrolyzed metal ions is maximized but below the pH value at which said metal ions are precipitated.

8. The method as described in claim 7 wherein said hydrolyzed metal ions are hydrolyzed aluminum ions and, during said step of maintaining, the pH of said aqueous medium is maintained in the range of from about 3.8 to about 5.2.

9. The method as described in claim 6 wherein said particulate property modifier used in said process is an uncoated particulate property modifier comprised of a material which yields said hydrolyzed metal ions when said surface is exposed to said aqueous medium.

10. The method as described in claim 6 wherein said surface comprises a coating and said coating is comprised of a material which yields said hydrolyzed metal ions when said surface is exposed to said aqueous medium.

11. The method as described in claim 10 wherein said coating is a hydrous alumina coating.

12. The method as described in claim 6 wherein said particulate property modifier used in said process is a material selected from the group consisting of: titanium dioxide; iron oxide; nickel titanate; antimony oxide; lead chromate; zinc oxide; cadmium sulfide; fiberglass; ceramic particles; colloidal materials; fire retardants such as aluminum trihydrate and magnesium hydroxide; calcium carbonate; and combinations thereof.

13. The method as described in claim 5 wherein said process further comprises the step of adsorbing an uncharged hydrocarbon on said surfactant, said uncharged hydrocarbon being selected from the group consisting of: alcohols having linear or branched hydrocarbon chains comprising from about 4 to about 30 carbon atoms and paraffins having linear or branched hydrocarbon chains comprising from about 4 to about 30 carbon atoms.

14. A polymeric composition formed by the method of claim 7.

15. A polymeric composition formed by the method of claim 8.

16. A polymeric composition formed by the method of claim 9.

17. A polymeric composition formed by the method of claim 10.

18. A polymeric composition formed by the method of claim 11.

19. A polymeric composition formed by the method of claim 12.

20. A polymeric composition formed by the method of claim 13.

* * * * *

UNITED STATES PATENT AND TRADEMARK OFFICE
CERTIFICATE OF CORRECTION

PATENT NO. : 5,362,770
DATED : November 8, 1994
INVENTOR(S) : Bruce R. Palmer and Rodney D. Stramel It is certified that error appears in the above-identified patent and that said Letters Patent is hereby corrected as shown below:

Column 18, line 57-8, delete "fire retardants such as"

Column 18, line 58, insert --;-- after "trihydrate"

Column 18, line 58, delete "and"

Signed and Sealed this

Twenty-fifth Day of November, 1997

Attest:

BRUCE LEHMAN

Attesting Officer

Commissioner of Patents and Trademarks